Jan. 2, 1940.
N. C. BREMER
2,185,702
ROLLER CHAIN
Filed July 8, 1938
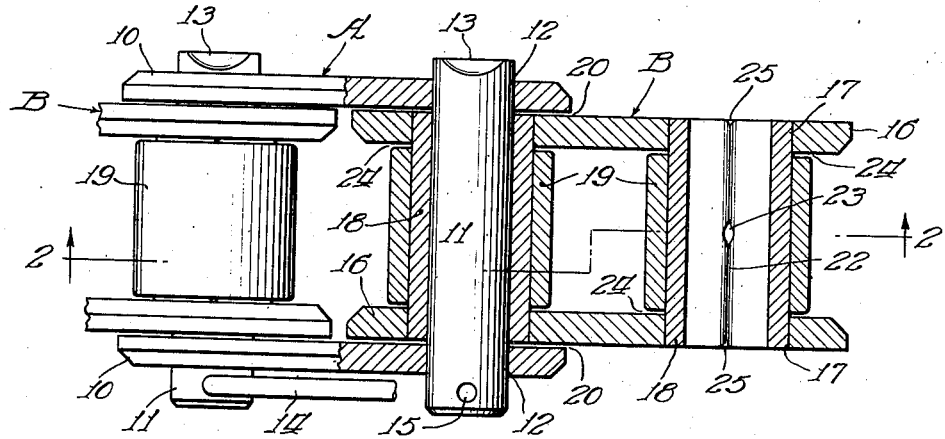
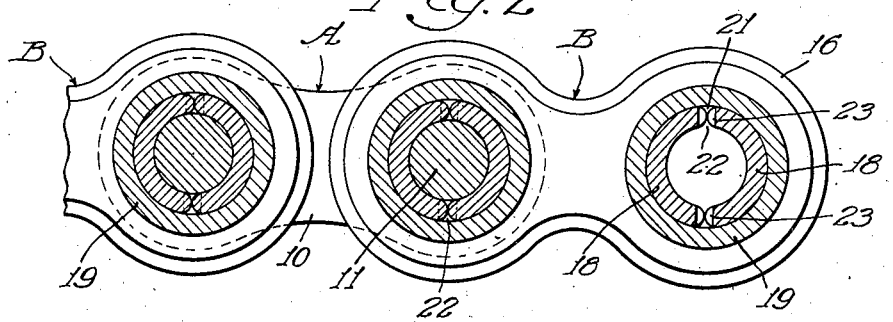
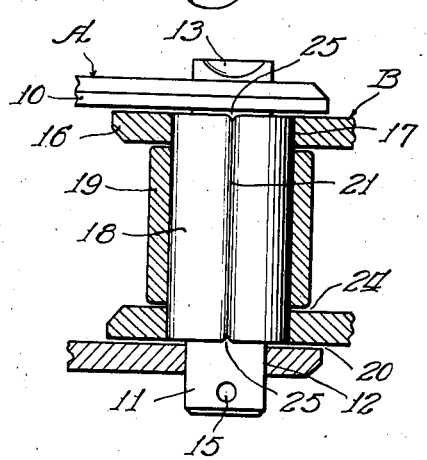
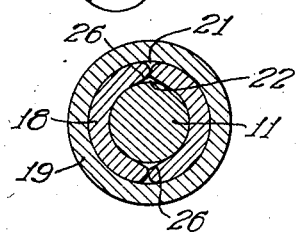
Inventor:
Norman C. Bremer
By: Edward C. Fitzbaugh
Atty.

Patented Jan. 2, 1940

2,185,702

UNITED STATES PATENT OFFICE 2,185,702

ROLLER CHAIN

Norman C. Bremer, Ithaca, N. Y., assignor to Morse Chain Company, Ithaca, N. Y., a corporation of New York Application July 8, 1938, Serial No. 218,092

8 Claims. (Cl. 74—257)

This invention relates to power-transmitting roller chains of the type wherein alternate links are provided with pins journalled in bushings which are fixed in the intervening links, and wherein sprocket-engaging rollers are journalled upon the exterior surfaces of such bushings.

The primary object of the invention is to provide a chain of this type having improved facilities for lubrication of all of the wearing surfaces thereof, particular attention being given to the problem of transmission of lubricant from the exterior surfaces of the chain to the interior bearing surfaces of the bushings, and the coacting pin surfaces. This is a very serious problem for the reason that the greater percentage of wear occurs in these inner surfaces.

The conventional method of applying lubricant to a transmission chain is to deposit it upon the rollers at the center of the chain, or between the side plates of the roller links (the links in which the bushings are fixed). In order to reach the pin surfaces of the conventional chain, the lubricant must in some manner gain access to the ends of the bushings where they open into the exterior faces of the roller link plates, and must thence work its way axially into the bushings. As a result, very little lubricant finds its way into the bushing interior. The entrance of the lubricant into the ends of the bushing is largely blocked off by the side plates of the pin links, which practically seal the ends of the bushings. Most of the lubricant will be thrown off the chain without entering the bushings.

Much thought and effort has been expended in attempt to provide a satisfactory roller chain structure having oil passages adapted to conduct oil from the exteriors of the rollers into the joints of the chain. Slots and holes have been punched or drilled into the bushings, and in some degree have accomplished their purpose, but without any marked degree of success. Others have proposed to construct the bushings in the form of segments, held in spaced relation to each other by specially shaped roller plate apertures in which the ends are mounted, the spacing of the segments providing axially extending slots through which lubricant may pass from the exterior to the interior of the bushings. But this latter type of construction has several disadvantages. In the first place, the load-bearing surfaces are interrupted, resulting in concentration of stress at the edges of the segments. In the second place, the forming of irregularly shaped openings in the roller plate adds considerably to the cost of dies. Thirdly, a roller-link plate thus constructed with irregular shaped apertures is greatly inferior in strength to the conventional plate with completely circular apertures.

The most important object of the present invention is, therefore, to provide a roller chain of the type specified, having greatly improved facilities for lubricating the interiors of the bushings thereof, so as to greatly increase the life of the chain, and yet which is as inexpensive or more inexpensive in construction than conventional chains of this type heretofore available, is equally as strong and sturdy as the conventional chain, and in which the load-bearing surfaces of the bushings are as complete and uniform, and as efficient in their relation with the coacting bearing surfaces of pins and rollers, as in the conventional chain.

Another object of the invention is to provide a roller chain of the type specified, in the construction of which the bushings may be hardened by a conventional carburizing process, in a much more efficient and uniform manner than has hitherto been possible in the hardening of one-piece bushings.

Other objects, the advantages and uses of the invention will become apparent after reading the following specification and claims, and after consideration of the drawing forming a part of the specification, wherein:

Fig. 1 is a plan view, partly in section, of a roller chain embodying the invention;

Fig. 2 is a longitudinal sectional view through the same, taken as indicated by the line 2—2 of Fig. 1;

Fig. 3 is a sectional view illustrating a somewhat modified form of the invention; and Fig. 4 is a cross section of a bushing and roller of a further modification of the invention.

As illustrative of one form in which the invention may be embodied, I have shown in Fig. 1 a section of a roller chain comprising two links and a portion of a third. The link, indicated generally at A, which may be termed a pin link, comprises a pair of spaced side plates 10, connected by pins 11, which extend through apertures 12, in the side plates 10. The pins 11 are provided with deformed heads 13 and retainer yokes 14, the ends of which are extended through openings 15 in the pins 11, for securing the side plates 10 against removal from the ends of the pins.

The link, indicated generally at B, which may be termed the roller link, comprises a pair of side plates 16 having bushing apertures 17 into which are pressed the ends of bushings 18. Each bushing 18 comprises two semi-cylindrical segments assembled with their longitudinal edges in abutting relationship, and secured in such assembled relationship by the engagement of their end regions in the apertures 17. In the assembled chain, a pin 11 of a pin link A, is extended through a bushing 18 of an adjacent roller link B.

Encircling each bushing 18 is a sprocket engaging roller 19, the inner surface of which is in bearing engagement with the exterior surface of the bushing 18.

In the absence of specific provision for lubrication of the coacting bearing surfaces of the pins 11 and the bushings 18, it would be necessary for lubricant to work its way through the spaces 20 between overlapping ends of the side plates 10 and 16 respectively, until it reached the ends of the bushings 18, exposed in the outer surfaces of the side plates 16, whence it must travel axially inwardly between the pins 11 and interior surfaces of the bushings 18. Under the conventional method of applying lubricant to the rollers 19, very little of such lubricant would be able to travel this course.

In a very simple and inexpensive manner, without weakening the construction, the present invention provides capillary lubricant channels 21 and 22 in the exterior and interior surfaces of the bushing 18 respectively, extending from end to end thereof. The channels 21 and 22 are connected, in the alternate form of the invention shown in Figs. 1 and 2, by radial ducts 23.

The channels 21 and 22 are both formed simply by rounding off the abutting edges of the segments comprising the bushings, during the formation of the segments. As these segments are usually formed by pulling through drawing dies, the addition of the rounded edges is accomplished very easily.

In addition, the corners of the segments may be rounded off so as to form in the ends of the assembled bushing, radially extending notches 25 establishing communication between the channels 21 and 22.

The radial ducts 23 are formed by registering notches in the edges of the respective segments of the bushings.

The segments are completely semi-cylindrical and therefore the assembled bushing offers substantially complete cylindrical bearing surface, both inside and out.

By arranging the segments in abutting relationship, they produce substantially the same buttressing effect in connecting together the side plate 16 as is produced by an integral bushing. This is not true where the segments are spaced apart, and rely simply upon their fitting engagement in the irregularly shaped apertures in the side plates, for purchase against canting relative to the plates.

The openings 17 in which the bushings are secured, are perfectly circular openings, which may be formed much less expensively and with much greater accuracy than the irregularly shaped openings necessary for receiving spaced apart segments.

If desired, the inner surface of a bushing may be flattened, as at 26, in Fig. 4, flaring outwardly from the cylindrical surface of the pin 11, so as to provide extended, thin wedge-shaped spaces connecting the channels 22 with the areas of contact of the bushing with the pin, which areas of contact may be approximately 60 degrees on each side of the bisecting plane of the segments, or a total of 120 degrees for each segment.

Lubricant applied to the chain between the pin link plates 16, may travel through the space 24, between the ends of a roller 19 and the inner faces of the side plates 16, reaching the exterior surface of the bushing 18, and entering the exterior capillary channels 21 at points spaced from their ends the thickness of the side plates 16.

From these points, the lubricant may travel in the channels 21 toward the longitudinal center of the bushing 18, and in the outer regions of the channels 21 toward the end of the bushing 18.

Reaching the longitudinal center of the bushing, the lubricant may pass through the radial ducts 23 and into the interior channels 22 from which it may be distributed to the engaging surfaces of the pin 11 and of the bushing.

The channels 21 and 22, as a result of being formed in the manner stated, are of concave wedge shape, the sides of the channels gradually approaching parallelism toward the bottoms of the channels. Thus the bottom regions of the channels offer strong capillary attraction to the lubricant, while the outer regions of the channels serve to distribute the lubricant to the bearing surfaces.

In the preferred form of the invention shown in Fig. 3, the radial ducts 23 are eliminated. Lubricant passing from the spaces 24 through the channels 21 toward the ends of the bushing, will travel through the radial notches 25 to reach the interior of the bushing. Tests have demonstrated that this construction is effective in maintaining an oil film between all working areas, providing the ends of the segments are well rounded as may be accomplished by a prolonged tumbling of the segments.

In the conventional roller chain, generous clearance is provided between the ends of the rollers 19 and the side plates 16, so that definite assurance is had that the lubricant may easily work its way to the exterior surface of the bushing.

An advantage of the segmental form of bushing construction is a definite improvement in uniformity and efficiency of hardening of the inner surface of the bushing, under a standard carburizing process for imparting a hard wearing surface. The reason for this is that the inner surfaces of the segments are accessible to intimate contact with the carburizing agent, and the likelihood of soft spots occurring as a result of improper agitation of the carbonaceous gases is obviated.

Subsequent cooling during the quenching operation is also more effective for the reason that the quenching medium is more free to circulate over the inner surface. This is extremely important in view of the fact that maximum hardness is more necessary in the inner surface than in the outer surface which is of greater area.

I claim:

1. In a roller chain, in combination with spaced pin link side plates connected by pins and embracing a pair of spaced roller link side plates having bushing apertures, a bushing, the ends of which are secured in said apertures, and a member in bearing relation to a cylindrical surface of said bushing, said bushing being split and having abutting longitudinal edges that are rounded to form, in conjunction with an adjacent surface of said member, a capillary, lubricant conducting channel of concave sided wedge shape.

2. In a roller chain, in combination with spaced pin link side plates connected by pins and embracing a pair of spaced roller link side plates having bushing apertures, a bushing, the ends of which are secured in said apertures, and a member in bearing relation to a cylindrical surface of said bushing, said bushing being split and having abutting longitudinal edges that are rounded to form, in conjunction with an adjacent surface of said member, a capillary, lubricant conducting channel, the sides of which progressively approach parallelism in the direction of the bottom thereof.

3. In a roller chain, in combination with spaced pin link side plates connected by pins and embracing a pair of spaced roller link side plates having bushing apertures, a bushing, the ends of which are secured in said apertures, and a member in bearing relation to a cylindrical surface of said bushing, said bushing being formed to provide, in conjunction with an adjacent surface of said member, an axially extending, capillary lubricant-conducting channel of concave sided wedge shape, the sides of which progressively approach parallelism in the direction of the bottom thereof.

4. In a roller chain, in combination with spaced pin link side plates connected by pins and embracing a pair of spaced roller link side plates having bushing apertures, a bushing, the ends of which are secured in said apertures, and a roller encircling and journalled upon said bushing, said bushing comprising complementary semi-cylindrical segments having abutting longitudinal edges that are rounded to cooperatively form axially extending, lubricant-conducting channels.

5. In a roller chain, in combination with spaced pin link side plates connected by pins and embracing a pair of spaced roller link side plates having bushing apertures, a bushing, the ends of which are secured in said apertures, and a roller encircling and journalled on said bushing, said bushing comprising complementary semi-cylindrical segments having abutting longitudinal edges that are rounded so as to form exterior and interior axially extending capillary lubricant conducting channels, said bushing being formed with a radial duct providing communication between said channels.

6. A roller chain as defined in claim 5, wherein said radial duct is formed by cooperating notches in the abutting edges of said segment.

7. In a roller chain, in combination with spaced pin link side plates connected by pins and embracing a pair of spaced roller link side plates having bushing apertures, a bushing, the ends of which are secured in said apertures, said pins extending through and journalled in said bushing, and a roller encircling and journalled on said bushing, said bushing comprising complementary semi-cylindrical segments, the abutting edges of which are rounded so as to cooperatively form exterior and interior axially extending capillary lubricant conducting channels, and the corners of which are likewise rounded to form between the ends of said bushing and the inner faces of the pin link plates, radial ducts establishing communication between said exterior and interior capillary channels.

8. In a roller chain, in combination with spaced pin link side plates, a pin connecting said plates, a pair of spaced bushing link side plates embraced between said pin link plates and having bushing apertures through which said pin extends, a bushing, the end regions of which are mounted in said apertures, and a roller encircling said bushing between said bushing link plates, said bushing being provided with circumferentially spaced longitudinal grooves in its exterior surface, extending to the end of the bushing and thereby forming, together with said bushing apertures passages extending from the inner to the outer faces of said bushing link plates and adapted to conduct lubricant from the spaces betweeen the ends of the roller and the inner faces of the bushing link plates to the space between the roller link plates and the adjacent pin link plates, the bushing being provided in its ends with radial notches communicating with said longitudinal grooves and providing, in association with the adjacent inner faces of the pin link plates, radially extending lubricant conducting passages through which the lubricant may travel radially inwardly to the pin and thence into the interior of the bushing.

NORMAN C. BREMER.